United States Patent
Uno

(10) Patent No.: US 10,117,153 B2
(45) Date of Patent: Oct. 30, 2018

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Kazutaka Uno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/232,220

(22) Filed: Aug. 9, 2016

(65) Prior Publication Data

US 2017/0070938 A1    Mar. 9, 2017

(30) Foreign Application Priority Data

Sep. 4, 2015    (JP) ................. 2015-175012

(51) Int. Cl.
*H04W 36/00* (2009.01)
*H04W 36/36* (2009.01)
*H04W 36/14* (2009.01)
*H04W 36/24* (2009.01)
*H04W 84/12* (2009.01)

(52) U.S. Cl.
CPC ....... *H04W 36/36* (2013.01); *H04W 36/0088* (2013.01); *H04W 36/14* (2013.01); *H04W 36/24* (2013.01); *H04W 84/12* (2013.01)

(58) Field of Classification Search
CPC ..... H04W 36/14; H04W 36/24; H04W 36/36; H04W 84/12; H04W 36/0088; H04W 48/16; H04W 84/20; H04W 88/06; H04W 8/005
USPC ........................................ 455/437
See application file for complete search history.

(56) References Cited

U.S. PATENT DOCUMENTS

| | | | | |
|---|---|---|---|---|
| 2005/0288022 A1* | 12/2005 | Ryu | ............ | H04W 36/0033 455/439 |
| 2011/0201335 A1* | 8/2011 | Garrett | ............ | H04W 36/32 455/436 |
| 2012/0014302 A1* | 1/2012 | Kim | ............ | H04W 36/24 370/311 |
| 2014/0100003 A1* | 4/2014 | Hsieh | ............ | H04W 52/0241 455/574 |
| 2015/0036540 A1 | 2/2015 | Kassline et al. | | |
| 2015/0098388 A1* | 4/2015 | Fang | ............ | H04W 48/16 370/328 |

* cited by examiner

*Primary Examiner* — Timothy Pham
(74) *Attorney, Agent, or Firm* — Canon U.S.A., Inc. IP Division

(57) ABSTRACT

A communication apparatus participates in a first wireless network and if the communication apparatus is performing data communication with a communication partner, the communication apparatus will not search for other wireless networks and/or switch to another wireless network. If no data communication with a communication partner is occurring, the communication apparatus can search for other wireless networks and switch to a detected wireless network.

15 Claims, 6 Drawing Sheets

[CG OF NAN CLUSTER X] < [CG OF NAN CLUSTER Y]

[CG OF NAN CLUSTER X] < [CG OF NAN CLUSTER Y]

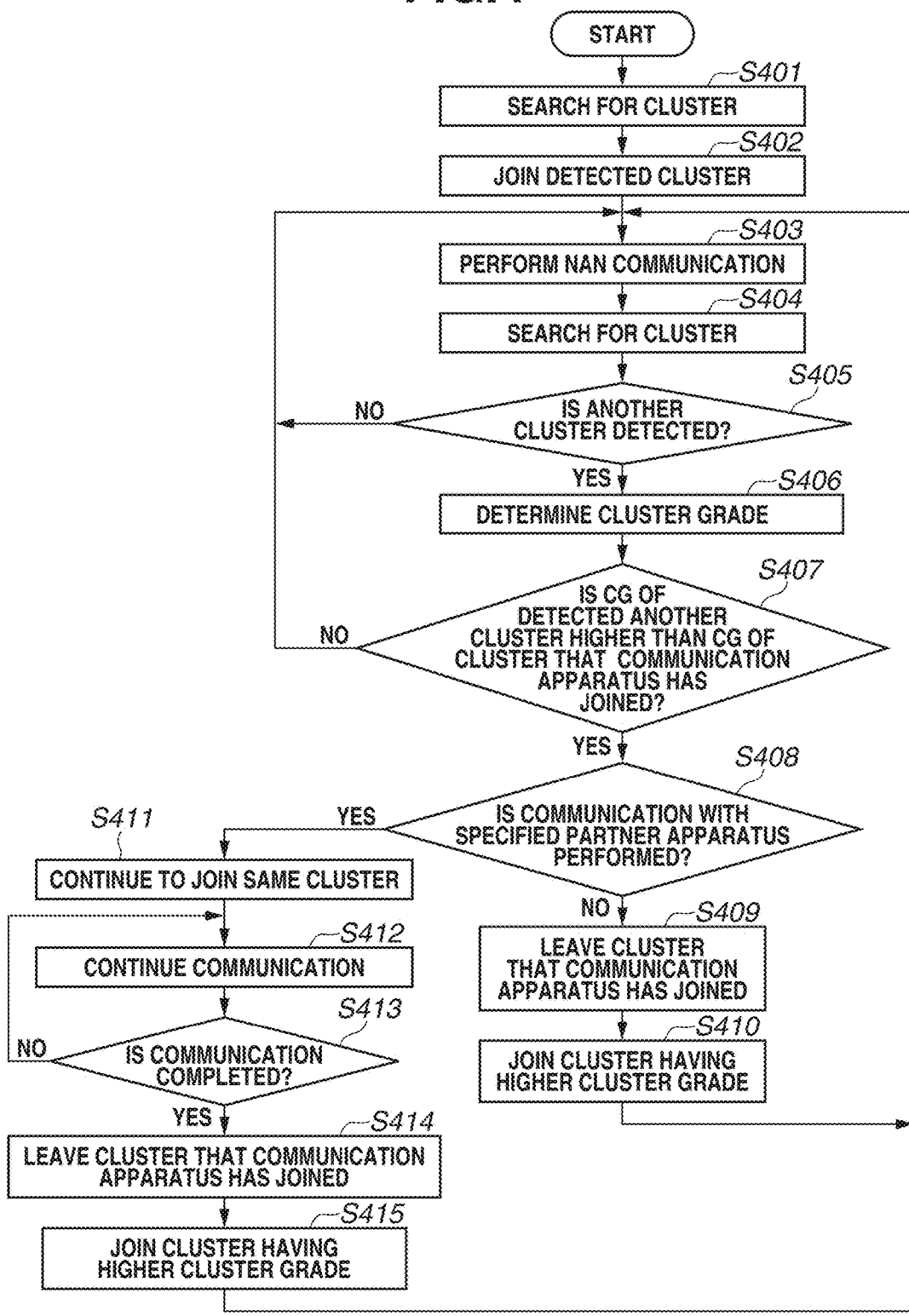

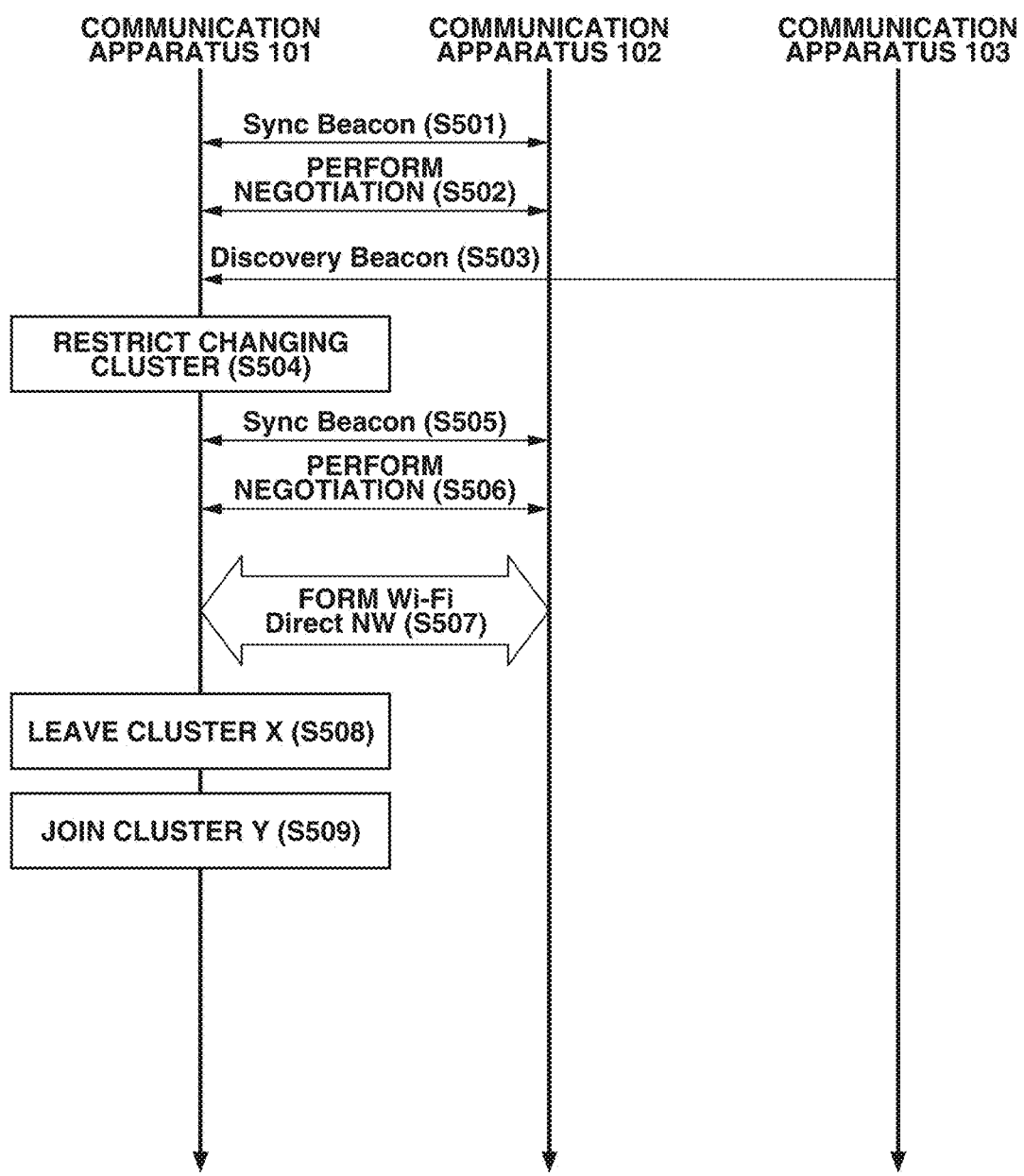

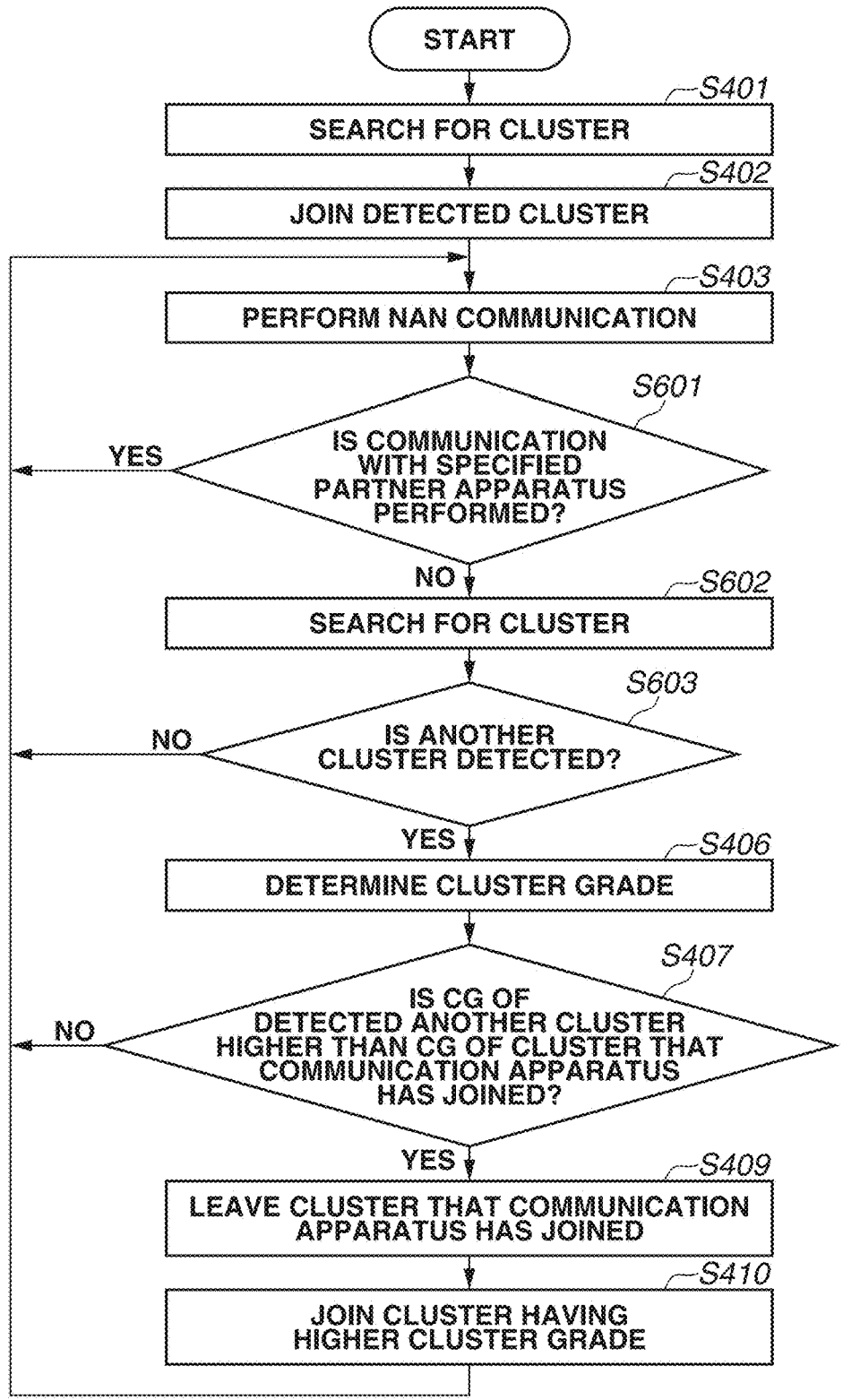

COMMUNICATION APPARATUS, COMMUNICATION METHOD, AND STORAGE MEDIUM

BACKGROUND

Field

Aspects of the present invention generally relate to a communication apparatus that changes a wireless network that the communication apparatus joins and performs communication.

Description of the Related Art

US 2015/036540 discusses the Neighbor Awareness Networking (NAN) technology enabling a communication apparatus to detect available services (functions) and various types of information at low power consumption.

In NAN, a wireless network (NAN cluster) is formed, and services and various types of information can be detected in the NAN cluster. Further, in a case where a communication apparatus detects a partner apparatus that provides a desired service or desired information, the communication apparatus can perform data communication with the specified partner apparatus. In this way, a user using the communication apparatus can use the desired service provided by the partner apparatus or acquire the desired information.

NAN defines a cluster grade (CG), which indicates the priority of a NAN cluster. In NAN, it is recommended that when a communication apparatus in a NAN cluster detects another NAN cluster having a higher CG, the communication apparatus should switch to the detected NAN cluster having the higher CG.

In this way, a NAN cluster having a lower CG disappears, and the NAN cluster having a higher CG remains, whereby a situation where excessive number of NAN clusters exist can be prevented.

However, in a case where a communication apparatus detects a NAN cluster having a higher CG and switches to the detected NAN cluster while performing data communication with a specified partner apparatus, there arises an issue of a disconnection of the data communication during the data communication.

SUMMARY

In view of the foregoing issue, aspects of the present invention are directed to reducing the risk, in a case where data communication is currently performed with a specified communication partner, of disconnection of the data communication.

According to an aspect of the present invention, a communication apparatus includes a detection unit configured to detect a second wireless network during participation in a first wireless network, a determination unit configured to, in a case where the detection unit detects the second wireless network, determine whether data communication with a specified communication partner is performed in the first wireless network, and a switching unit configured to, in a case where the determination unit determines that data communication with a specified communication partner is performed, not switch a wireless network to join the second wireless network from the first wireless network, and configured to, in a case where the determination unit determines that data communication with a specified communication partner is not performed, switch the wireless network to join the second wireless network from the first wireless network, wherein a priority of the second wireless network set by a second master apparatus of the second wireless network is higher than a priority of the first wireless network set by a first master apparatus of the first wireless network.

Further features of aspects of the present invention will become apparent from the following description of exemplary embodiments with reference to the attached drawings.

BRIEF DESCRIPTION OF THE DRAWINGS

FIG. 4 is a flow chart that is realized by the communication apparatus.

FIG. 5 is a sequence chart that is realized by the communication apparatus.

FIG. 6 is a flow chart that is realized by the communication apparatus.

DESCRIPTION OF THE EMBODIMENTS

Figure 1:
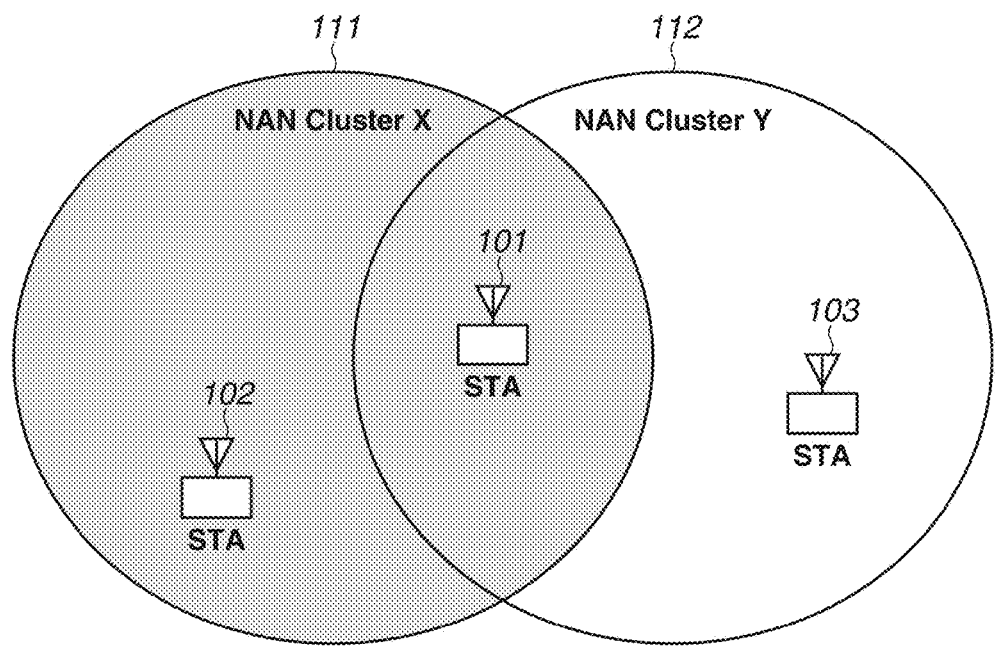
FIG. 1 is a diagram illustrating a configuration of a communication system.

FIG. 1 illustrates the configuration of a communication system according to a first exemplary embodiment. Communication apparatuses 101, 102, and 103 each join a wireless network (NAN cluster) compliant with the Neighbor Awareness Networking (NAN) standard and perform wireless communication. In the NAN cluster, each communication apparatus performs wireless communication in accordance with a communication protocol defined in the NAN standard.

Wireless networks 111 and 112 are wireless networks compliant with NAN. Hereinafter, the wireless network 111 will be referred to as a cluster X, and the wireless network 112 will be referred to as a cluster Y.

The clusters X and Y use Channel 6 in the 2.4 GHz band as a frequency channel.

The communication apparatuses 101 and 102 join the cluster X. Further, the communication apparatuses 101 and 103 join the cluster Y. When the communication apparatus 101 joins a cluster, the communication apparatus 101 transmits and receives an informing signal within a discovery window (DW) determined in the cluster that the communication apparatus 101 has joined. In this way, the communication apparatus 101 becomes able to perform NAN-compliant data communication in the cluster.

Within a DW, each apparatus in a cluster is in an awake state and performs wireless communication. On the other hand, each apparatus is in a sleep state, which is a power-saving state, and restricts wireless communication outside the DWs. In this way, each apparatus can perform data communication with a small amount of power.

The length of one DW is 16 time unit (TU), and the DW interval is 512 TU. In the present exemplary embodiment, 1 TU is about 1 millisecond. Further, the term "informing signal" refers to a synchronization beacon (sync beacon), which is defined in the NAN standard and is a synchronization signal for the synchronization with another communication apparatus in the cluster. The communication apparatus 101 periodically transmits a synchronization beacon in each DW.

Further, the communication apparatuses 102 and 103 having joined the respective clusters each operate as NAN Master compliant with NAN. Each Master periodically transmits a discovery beacon, which is defined in the NAN standard and is a detection signal for enabling other communication apparatuses to detect the cluster, at an interval of 100 TU.

Each communication apparatus in a cluster operates as one of the Master, Non-Master Sync, and Non-Master Non-Sync roles.

An apparatus operating as Master identifies a DW and transmits a sync beacon. Further, an apparatus operating as Master transmits a discovery beacon, which is a signal for detecting the NAN cluster, for allowing an apparatus that is not in the cluster to detect the NAN cluster. In one cluster, at least one apparatus operates as Master.

A terminal operating as Non-Master Sync transmits a sync beacon but does not transmit a discovery beacon. A terminal operating as Non-Master Non-Sync transmits neither a sync beacon nor a discovery beacon.

Further, each cluster has a set value of a cluster grade (CG), which is defined in the NAN standard and is a value indicating the priority of a cluster that each apparatus should join. In the present exemplary embodiment, the CG of the cluster Y is higher than the CG of the cluster X. Specifically, an apparatus having detected both the clusters X and Y preferentially joins the cluster Y.

Figure 2:
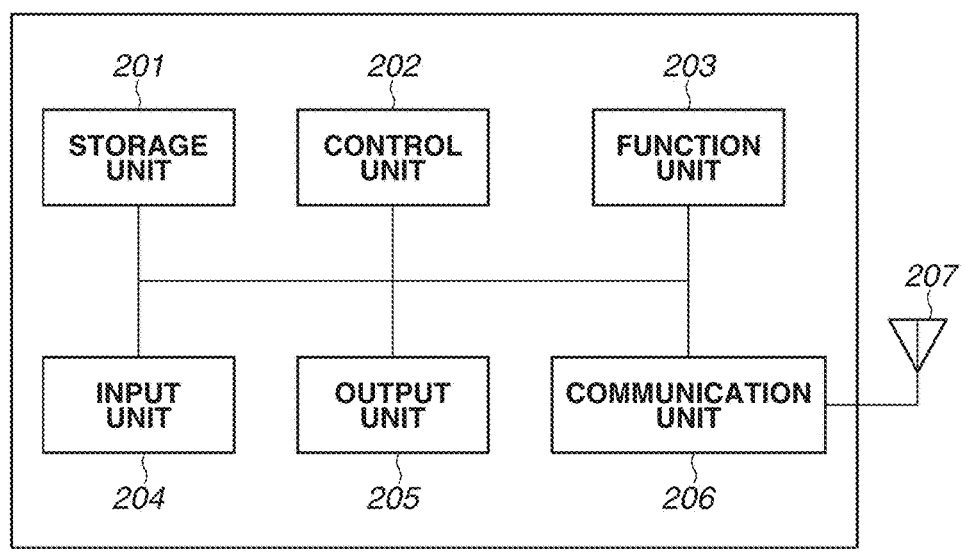
FIG. 2 is a diagram illustrating a hardware configuration of a communication apparatus.

FIG. 2 illustrates a hardware configuration of the communication apparatus 101. The hardware configurations of the communication apparatuses 102 and 103 are similar to the hardware configuration of the communication apparatus 101, so description thereof is omitted.

A storage unit 201 includes a memory, such as a read-only memory (ROM), a random access memory (RAM), etc. and stores programs for execution of various operations described below and various types of information, such as communication parameters for wireless communication, etc. Not only a memory, such as a ROM, a RAM, etc. but also a storage medium, such as a flexible disk, a hard disk, an optical disk, a magneto-optical disk, a compact disk ROM (CD-ROM), a compact disk recordable (CD-R), a magnetic tape, a non-volatile memory card, a digital versatile disk (DVD), etc. may be used as the storage unit 201. Further, the storage unit 201 may include a plurality of memories.

A control unit 202 includes a processor, such as a central processing unit (CPU), a micro processing unit (MPU), etc. and executes a program stored in the storage unit 201 to control the entire communication apparatus 101. The control unit 202 may control the entire communication apparatus 101 by cooperation between a program stored in the storage unit 201 and an operating system (OS). Further, the control unit 202 may include a plurality of processors, such as a multi-core processor, etc. so that the plurality of processors controls the entire communication apparatus 101.

Further, the control unit 202 controls a function unit 203 to execute predetermined processing, such as image capturing, printing, projecting, etc. The function unit 203 is hardware causing the communication apparatus 101 to execute predetermined processing. For example, in a case where the communication apparatus 101 is a camera, the function unit 203 is an image capturing unit and executes image capturing processing. Further, for example, in a case where the communication apparatus 101 is a printer, the function unit 203 is a printing unit and executes printing processing. Furthermore, for example, in a case where the communication apparatus 101 is a projector, the function unit 203 is a projecting unit and executes projecting processing. Data to be processed by the function unit 203 may be data stored in the storage unit 201 or data acquired through communication with another communication apparatus via a communication unit 206 described below.

An input unit 204 receives various user operations. An output unit 205 outputs various types of output to the user. The output by the output unit 205 includes at least one of a display on a screen, audio output by a speaker, vibration output, etc. The input unit 204 and the output unit 205 may be realized in a single module, such as a touch panel.

The communication unit 206 controls wireless communication compliant with NAN and controls Internet Protocol (IP) communication. Further, the communication unit 206 controls an antenna 207 to transmit and receive wireless signals to perform wireless communication. The communication apparatus 101 communicates with another communication apparatus, such as the communication apparatus 102, etc. via the communication unit 206 to transmit or receive function information about the communication apparatus 101, and contents, such as image data, document data, video data, etc.

Figure 3:
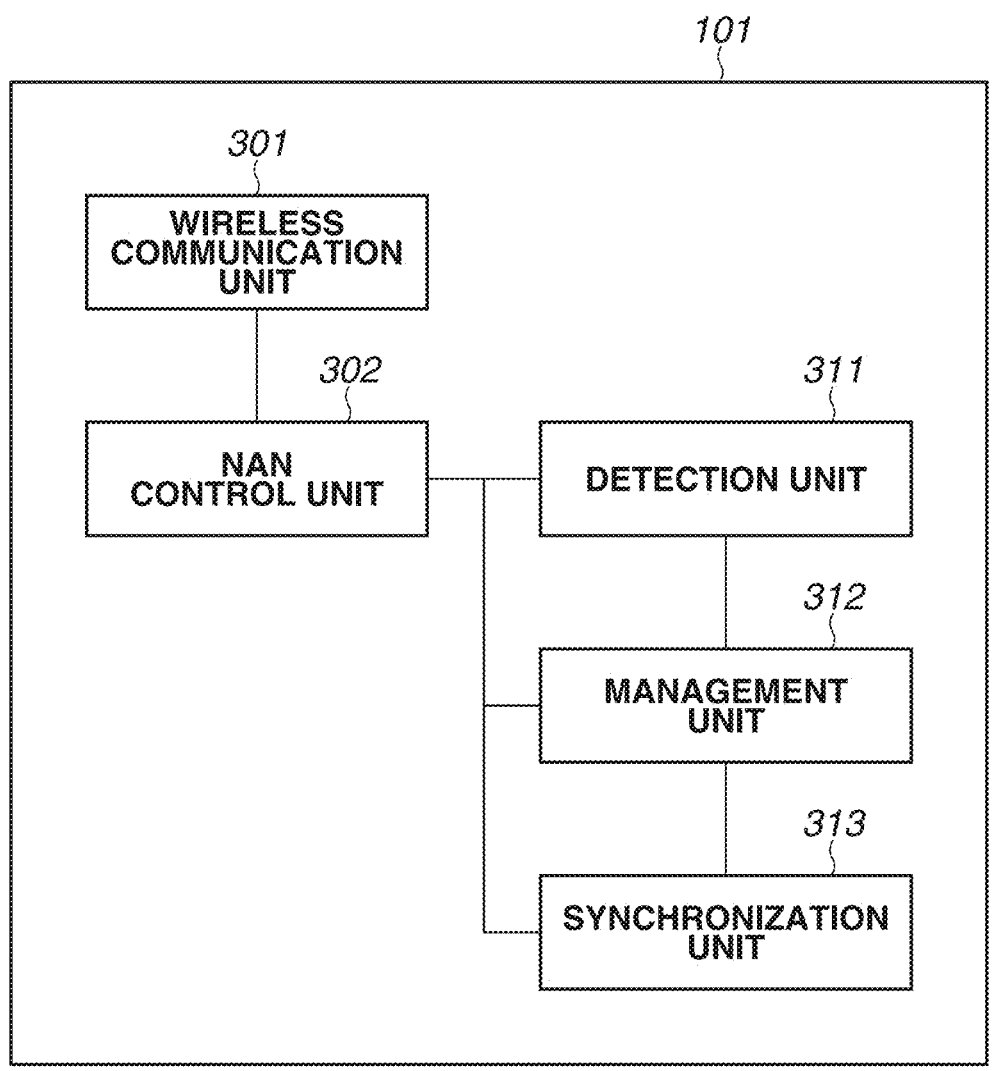
FIG. 3 is a functional block diagram illustrating the communication apparatus.

FIG. 3 illustrates software function blocks that are realized by the control unit 202 of the communication apparatus 101. The control unit 202 realizes the software function blocks by reading a program stored in the storage unit 201. At least a part of the software function blocks illustrated in FIG. 3 may be realized by hardware. In a case of realizing the software function blocks by hardware, for example, a predetermined compiler may be used to generate a dedicated circuit on a field programmable gate array (FPGA) based on a program for realizing a function block, and the generated dedicated circuit may be used as a hardware module having the function of the software module. Further, a gate array circuit may be formed as in the case of the FPGA to realize a function as hardware.

A wireless communication unit 301 controls the communication unit 206, etc. to perform IEEE 802.11 wireless communication with other communication apparatuses, such as the communication apparatuses 102 and 103. A NAN control unit 302 controls a detection unit 311, a management unit 312, and a synchronization unit 313 to control the entire NAN functions. The detection unit 311 receives informing signals from other communication apparatuses having joined a NAN cluster and detects the NAN cluster.

The management unit 312 manages network information about a detected NAN cluster. Network information refers to, for example, timing information (time synchronization function (TSF)) about the DW timing in the detected cluster and CG information. These pieces of network information are included in a discovery beacon, which is a detection signal.

The synchronization unit 313 performs joining processing to join a detected NAN cluster. Specifically, the synchronization unit 313 transmits and receives an informing signal in the DW based on the TSF managed by the management unit 312.

FIG. 4 is a flow chart illustrating a flow of processing. When a NAN function is activated in the communication apparatus 101, the control unit 202 reads a program stored in the storage unit 201 and executes the program to realize the processing illustrated in FIG. 4. In the present exemplary embodiment, a NAN function is activated in response to a user instruction to activate the NAN function. However, the foregoing configuration is not a limiting configuration, and a NAN function may be activated in conjunction with activation of a specific application (game, information collection application, etc.). Further, a NAN function may be activated at a specific time or may be activated when the communication apparatus 101 is in a specific location.

Further, at least a part of the flow chart illustrated in FIG. 4 may be realized with hardware. In a case of realizing the flow chart with hardware, for example, a predetermined compiler may be used to automatically generate a dedicated circuit on a field programmable gate array (FPGA) based on a program for realizing each step. Further, a gate array circuit may be formed as in the case of the FPGA to realize the flow chart in the form of hardware. Further, the flow chart may be realized using an application specific integrated circuit (ASIC).

First, in step S401, the communication apparatus 101 searches for a cluster that exists in the neighborhood. In the present exemplary embodiment, the communication apparatus 101 receives a detection signal from the communication apparatus 102 and detects the cluster X. In this stage, the communication apparatus 101 does not receive a detection signal from the communication apparatus 103 and thus does not detect the cluster Y.

If the communication apparatus 101 detects the cluster X, the communication apparatus 101 acquires network information from the received detection signal and manages the network information. Then, in step S402, the communication apparatus 101 joins the cluster X based on the acquired network information and transmits an informing signal in a DW determined in the cluster X. In the present exemplary embodiment, the communication apparatus 101 broadcasts a synchronization beacon (broadcasting).

If the communication apparatus 101 joins the cluster X, then in step S403, the communication apparatus 101 performs wireless communication (NAN communication) compliant with the NAN standard. In NAN communication, a publish, which is a notification signal for the notification of information about a function (compatible service or application) of the own apparatus, is transmitted and received. In place of or in addition to the publish, a subscribe, which is a search signal for searching for a function of other communication apparatuses being in a NAN cluster, may be transmitted and received. The publish and the subscribe are transmitted and received by broadcasting.

If a predetermined time elapses since the search, then in step S404, the communication apparatus 101 searches again for a cluster that exists in the neighborhood. The search is performed by waiting for a discovery beacon, which is a detection signal, within or outside the discovery windows.

The search may be performed again not when a predetermined time elapses but when a predetermined amount of movement is detected. Further, the search may be performed again in response to a user instruction. Further, the search may be performed again in response to activation of a specific application.

In the present exemplary embodiment, as a result of the search performed again, the communication apparatus 101 receives a detection signal from each of the communication apparatuses 102 and 103 and detects the clusters X and Y. In a case where a plurality of other clusters (clusters different from the cluster X) is detected as a result of the search performed again, "cluster Y" refers to a cluster, from among the plurality of other clusters, that has the highest CG.

In step S405, the communication apparatus 101 determines whether another cluster different from the cluster that the communication apparatus 101 has joined is detected as a result of the search performed again. If no another cluster is detected (NO in step S405), the processing returns to step S403. In the present exemplary embodiment, the cluster Y is detected as another cluster, so the processing proceeds to step S406.

On the other hand, if another cluster is detected (YES in step S405), then in step S406, the communication apparatus 101 determines whether the CG of the detected cluster is higher than the CG of the cluster that the communication apparatus 101 has joined. Specifically, a determination of a wireless network with a higher priority is performed. In the present exemplary embodiment, the CG of the cluster Y is determined as being higher than the CG of the cluster X. Specifically, it is determined that the communication apparatus 101 should preferentially join not the cluster X but the cluster Y.

As a result of the determination, if the CG of the detected cluster is lower than the CG of the cluster that the communication apparatus 101 has joined (NO in step S407), the processing returns to step S403.

On the other hand, if the CG of the detected cluster is higher than the CG of the cluster that the communication apparatus 101 has joined (YES in step S407), then in step S408, the communication apparatus 101 determines whether communication with a specified partner apparatus is performed in the cluster that the communication apparatus 101 has joined.

As used herein, the phrase "communication with a specified partner apparatus" refers to unicast or multicast communication with a partner apparatus specified by the user or the application. In the present exemplary embodiment, broadcast communication that is communication with the entire wireless networks is not included.

Specifically, it is the case where the communication apparatus 101 acquires information about a service (function) provided by the partner apparatus from a publish from the partner apparatus and performs communication in the cluster X for using the service (function) provided by the partner apparatus.

Further, for example, there may be a case where communication for using a service (function) provided by a partner apparatus is performed in a different wireless network in which communication is performed in accordance with a communication protocol different from the communication protocol in the cluster. In this case, in the cluster X, the communication apparatus 101 performs a negotiation with the communication apparatus 102 to change the current wireless network to the different wireless network compliant with the different communication protocol. In the negotiation, a determination of which one of the communication protocols should be complied with for forming a wireless network is performed, and parameters of the wireless network to be formed are shared. Such communication for the negotiation is also the communication with a specified partner apparatus.

In the present exemplar embodiment, the wireless network in which communication is performed in accordance with a different communication protocol is wireless network compliant with Wi-Fi Direct. However, the wireless network is not limited to the foregoing wireless network and may be a wireless network compliant with other communication protocols, such as the infrastructure mode or ad hoc mode defined in the IEEE 802.11 series, Bluetooth®, etc.

As a result of the determination, if the communication apparatus 101 determines that communication with a specified partner apparatus is not performed (NO in step S408), then in step S409, the communication apparatus 101 leaves the cluster the communication apparatus 101 has joined. Specifically, the communication apparatus 101 stops synchronizing with the DW defined in the cluster X and stops transmitting an informing signal in the DW. Then, in step S410, the communication apparatus 101 joins the cluster Y.

Specifically, the communication apparatus 101 switches the wireless network to join from the cluster X to the cluster Y. Thereafter, the processing returns to step S403, and the communication apparatus 101 starts communication in the cluster Y.

On the other hand, if the communication apparatus 101 determines that communication with a specified partner apparatus is performed (YES in step S408), then in step S411, the communication apparatus 101 does not leave the cluster that the communication apparatus 101 has joined. Specifically, the communication apparatus 101 continues to join the cluster X. Then, in step S412, the communication apparatus 101 continues the communication with the specified partner apparatus in the cluster X. Thereafter, if the communication with the specified partner apparatus is completed (YES in step S413), then in step S414, the communication apparatus 101 leaves the cluster that the communication apparatus 101 has joined. Then, in step S415, the communication apparatus 101 joins the cluster Y. Specifically, the communication apparatus 101 switches the wireless network to join from the cluster X to the cluster Y. Then, the processing returns to step S403, and the communication apparatus 101 starts communication in the cluster Y.

As used herein, the case where "the communication with the specified partner apparatus is completed" refers to a case where, for example, use of a service (function) provided by the partner apparatus is stopped or a case where formation of a wireless network in which communication is performed in accordance with a different communication protocol is completed.

In this way, the communication apparatus 101 does not leave the cluster X while performing the communication with the specified partner apparatus, whereby the communication can be continued without a disconnection. Further, when the communication with the specified partner apparatus is completed, the communication apparatus 101 can promptly switch the cluster to join to the cluster having a higher priority.

FIG. 5 is a sequence chart illustrating a case where the communication apparatus 101 is in the cluster X and newly detects the cluster Y. The communication apparatus 101 is in a state where the communication apparatus 101 currently executes a negotiation with the communication apparatus 102 to form a new wireless network compliant with Wi-Fi Direct, in order to use a service (function) provided by the communication apparatus 102. Specifically, the communication apparatus 101 currently performs communication with the specified partner apparatus in which the communication apparatus 102 is specified as the specified partner apparatus.

In step S501, the communication apparatus 101 transmits and receives a synchronization beacon, which is a synchronization signal, in the DW defined in the cluster X. Further, in step S502, the communication apparatus 101 performs communication with the specified partner apparatus which is the communication apparatus 102 in the DW and performs a negotiation to form a new wireless network in infrastructure mode.

In a case where the negotiation is not completed within one DW, the communication apparatus 101 continues the negotiation in the next DW. In place of or in addition to the foregoing, the communication apparatus 101 may continue the negotiation outside the DWs in the case where the negotiation is not completed within one DW. In the case of continuing the negotiation outside the DWs, the communication apparatus 101 temporarily shifts the state from the sleep state to the awake state and then performs the negotiation.

In the present exemplary embodiment, the negotiation is not completed within the DW described above and is continued in the next DW.

In step S503, while performing the negotiation, the communication apparatus 101 performs search processing and receives a discovery beacon, which is a detection signal, from the cluster Y and detects the cluster Y.

In the present exemplary embodiment, the CG of the cluster Y is higher than the CG of the cluster X, so it is desirable for the communication apparatus 101 to join the cluster Y. However, if the communication apparatus 101 switches the cluster to join from the cluster X to the cluster Y at this timing, the communication with the communication apparatus 102 is disconnected. Consequently, a Wi-Fi Direct wireless network for using the service (function) provided by the communication apparatus 102 is not formed, and user convenience is thereby decreased.

Thus, in step S504, the communication apparatus 101 does not switch the cluster to join from the cluster X to the cluster Y during the execution of the negotiation. Specifically, switching of the cluster is restricted.

Then, in step S505, the communication apparatus 101 transmits a synchronization signal in the next DW, and in step S506, the communication apparatus 101 performs the negotiation with the communication apparatus 102. In the present exemplary embodiment, the negotiation is completed within this DW, and in step S507, the communication apparatuses 101 and 102 form a Wi-Fi Direct wireless network.

Then, in step S508, the communication apparatus 101 leaves the cluster X in response to completion of the negotiation. Then, in step S509, the communication apparatus 101 joins the cluster Y. Thereafter, the communication apparatus 101 performs NAN communication in the cluster Y.

In this way, the communication apparatus 101 does not leave the cluster X while performing the communication with the specified partner apparatus, whereby the communication can be continued without a disconnection. Further, when the communication with the specified partner apparatus is completed, the communication apparatus 101 can promptly switch the cluster to join to the cluster having a higher priority.

While the foregoing describes that the communication apparatus 101 leaves the cluster X in response to completion of the negotiation, this is not a limiting configuration, and the communication apparatus 101 may switch the cluster to join in response to an event in which a detection signal is received again in the state in which the negotiation is completed. This configuration can also provide the effect similar to that described above.

Further, in step S411 in FIG. 4, an inquiry of whether to switch the cluster may be made to the user. If the user chooses not to switch the cluster, the communication apparatus 101 does not leave the cluster that the communication apparatus 101 has joined, and the processing proceeds to step S412.

On the other hand, if the user chooses to switch the cluster, the communication apparatus 101 stops the negotiation being executed, and the processing proceeds to step S414. This configuration can also provide the effect similar to that described above.

Further, the NAN data communication may be ended in response to a user instruction while the communication apparatus 101 is executing the processing illustrated in FIG. 4. In this case, the processing illustrated in FIG. 4 is ended. Further, in place of or in addition to a user instruction, the NAN data communication may be ended in response to an event in which the application is ended, a predetermined time elapses, the communication apparatus 101 leaves a predetermined location, or the remaining battery level falls below a threshold value.

The foregoing exemplary embodiment describes the switching performed between NAN wireless networks. However, an exemplary embodiment of the present invention is applicable to not only the switching performed between NAN wireless networks but also a switching performed between wireless networks compliant with the IEEE 802.11 series, Bluetooth®, the fourth or fifth generation mobile communication system (4G, 5G), Long Term Evolution (LTE) (3.9G), etc.

Further, whether the communication apparatus 101 can concurrently join a plurality of clusters may be checked, and if the communication apparatus 101 can concurrently join a plurality of clusters, the following processing may be performed in place of step S408 and the subsequent steps. Specifically, in a case where the cluster Y is detected, the communication apparatus 101 joins both the clusters X and Y regardless of whether the communication apparatus 101 is performing communication with a specified partner apparatus. In this case, the communication apparatus 101 may leave the cluster X in response to completion of the communication with the specified partner apparatus in the cluster X.

In this way, the communication apparatus 101 does not leave the cluster X so that even when the communication apparatus 101 currently performs communication with a specified partner apparatus, the communication can be continued without a disconnection.

In the first exemplary embodiment, whether communication with a specified partner apparatus is performed is determined in a case where search processing is performed and another cluster having a higher CG is detected. In a second exemplary embodiment, search processing is performed in a case where it is determined that communication with a specified partner apparatus is not performed.

The hardware configurations of communication apparatuses 101 to 103 and function block diagrams are similar to those in the first exemplary embodiment, so description thereof is omitted.

FIG. 6 is a flow chart illustrating a flow of processing. When a NAN function is activated in the communication apparatus 101, a control unit 202 reads a program stored in a storage unit 201 and executes the program to realize the processing illustrated in FIG. 6. In the present exemplary embodiment, a NAN function is activated in response to a user instruction to activate the NAN function. However, the foregoing configuration is not a limiting configuration, and a NAN function may be activated in conjunction with activation of a specific application (game, information collection application, etc.). Further, a NAN function may be activated at a specific time or may be activated when the communication apparatus 101 is in a specific location.

Steps similar to those in FIG. 4 are given the same reference numerals, and description of the steps is omitted.

First, in step S401, the communication apparatus 101 searches for a cluster that exists in the neighborhood. In step S402, the communication apparatus 101 detects the cluster X and joins the cluster X. If the communication apparatus 101 joins the cluster X, then in step S403, the communication apparatus 101 performs NAN communication.

Then, if a predetermined time elapses since the search, then in step S601, the communication apparatus 101 determines whether communication with a specified partner apparatus is performed. The determination may be performed when a predetermined amount of movement is detected, instead of when a predetermined time elapses. Further, the determination may be performed in response to a user instruction. Further, the determination may be performed in response to activation of a specific application. Specific processing performed in the determination is similar to step S408, so description thereof is omitted.

If it is determined that communication with a specified partner apparatus is performed (YES in step S601), the processing returns to step S403. On the other hand, if it is determined that communication with a specified partner apparatus is not performed (NO in step S601), then in step S602, the communication apparatus 101 performs search processing again to search for a cluster that exists in the neighborhood. Specific processing performed in the search processing is similar to step S404, so description thereof is omitted.

If no another cluster is detected as a result of the search processing (NO in step S603), the processing returns to step S403. On the other hand, if another cluster is detected (YES in step S603), then in step S406, the communication apparatus 101 determines whether the CG of the detected another cluster is higher than the CG of the cluster that the communication apparatus 101 has joined. In a case where the communication apparatus 101 detects a plurality of other clusters, the communication apparatus 101 determines whether a CG of a cluster which is one of the detected plurality of other clusters and has the highest CG among the detected plurality of other clusters is higher than the CG of the cluster that the communication apparatus 101 has joined. As a result of the determination, if the CG of the detected another cluster is lower than the CG of the cluster that the communication apparatus 101 has joined (NO in step S407), the processing returns to step S403.

On the other hand, if the CG of the detected another cluster is higher than the CG of the cluster that the communication apparatus 101 has joined (YES in step S407), then in step S409, the communication apparatus 101 leaves the cluster X. Then, in step S410, the communication apparatus 101 joins the cluster Y. Specifically, the communication apparatus 101 switches the wireless network to join from the cluster X to the cluster Y. Thereafter, the processing returns to step S403, and the communication apparatus 101 starts communication in the cluster Y.

In the present exemplary embodiment, it is determined in step S601 that the communication apparatus 101 does not perform communication with a specified partner apparatus, so even if the wireless network to join is switched from the cluster X to the cluster Y, a problem such as a disconnection of the communication, etc. will not arise.

As described above, search processing for detecting another wireless network is not performed while the communication apparatus 101 is performing communication with a specified partner apparatus. In this way, even in a case where another wireless network having a higher priority exists, this another wireless network is not detected, so the communication apparatus does not switch the wireless network.

Accordingly, the communication apparatus does not leave the cluster X and, therefore, the communication can be continued without a disconnection. Further, when the communication with the specified partner apparatus is completed, the communication apparatus can promptly switch to the cluster having a higher priority.

An exemplary embodiment of the present invention can be realized by the processing in which a program for realizing a function of each exemplary embodiment described above is supplied to a system or an apparatus via a network or a storage medium and one or more processors of a computer of the system or the apparatus read and execute the program. Further, an exemplary embodiment of the present invention can also be realized by a circuit (e.g., application specific integrated circuit (ASIC)) configured to realize one or more functions.

In an exemplary embodiment of the present invention, while data communication with a specified communication partner is performed, even if another wireless network having a higher priority exists, the wireless network is not switched, whereby the risk of a disconnection of the data communication during the data communication can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-175012, filed Sep. 4, 2015, which is hereby incorporated by reference herein in its entirety.

What is claimed is:

1. A communication apparatus comprising:
one or more computers that cause the communication apparatus to:
perform scan for a Neighbor Awareness Networking (NAN) cluster, by receiving a discovery beacon, other than a first NAN cluster where the communication apparatus participates;
determine, in a case where a second NAN cluster, which has a cluster grade that is higher than a cluster grade of the first NAN cluster, is detected by the scan, whether the communication apparatus is performing wireless data communication, which is different from the scan, with a communication partner in the first NAN cluster;
continue participating in the first NAN cluster in a case where it is determined that the communication apparatus is performing the wireless data communication; and
stop participating in the first NAN cluster and join the second NAN cluster according to detection of the second NAN cluster in a case where it is determined that the communication apparatus is not performing the wireless data communication.

2. The communication apparatus according to claim 1, wherein the communication apparatus periodically transmits an informing signal during in a case where the communication apparatus participates in the first NAN cluster.

3. The communication apparatus according to claim 2, wherein the communication apparatus transmits the informing signal in a discovery window of the first NAN cluster.

4. The communication apparatus according to claim 3, wherein the data communication apparatus determines whether to be performing the wireless data communication outside the discovery window in the first NAN cluster.

5. The communication apparatus according to claim 2, wherein the informing signal is a synchronization beacon.

6. The communication apparatus according to claim 1, wherein the communication apparatus joins a wireless network where communication is performed according to another second communication protocol different from NAN protocol, and
wherein the wireless data communication is performed in order to join the wireless network.

7. The communication apparatus according to claim 1, wherein the discovery beacon is sent from an apparatus having participated in the second NAN cluster.

8. The communication apparatus according to claim 1, wherein the communication apparatus does not join the second NAN cluster while the communication apparatus is performing the wireless data communication.

9. The communication apparatus according to claim 1, wherein the communication apparatus joins the second NAN cluster according to completion of the wireless data communication in a case where it is determined that the communication apparatus is performing the wireless data communication.

10. The communication apparatus according to claim 1, wherein the communication apparatus stops participating in the first NAN cluster according to completion of the data communication in a case where it is determined the communication apparatus is performing the wireless data communication.

11. The communication apparatus according to claim 1, wherein the wireless data communication is a communication for accessing a service provided by the communication partner.

12. The communication apparatus according to claim 1, wherein the wireless data communication is performed by unicast or multicast.

13. The communication apparatus according to claim 1, wherein the communication apparatus is caused to scan for a NAN cluster in a case where the communication apparatus determines that the communication apparatus participates in the first NAN cluster.

14. A communication method comprising:

performing scanning for a Neighbor Awareness Networking (NAN) cluster, by receiving a discovery beacon, other than a first NAN cluster where the communication apparatus participates;

determining, in a case where a second NAN cluster, which has a cluster grade that is higher than a cluster grade of the first NAN cluster, is detected by the scan, whether the communication apparatuses is performing wireless data communication, which is different from the scan, with a communication partner in the first NAN clusters;

continuing participating in the first NAN cluster in a case where it is determined that the communication apparatus is performing the wireless data communication; and stopping participating in the first NAN cluster and join the second NAN cluster according to detection of the second NAN cluster in a case where it is determined that the communication apparatus is not performing the wireless data communication.

15. A non-transitory computer-readable storage medium storing computer executable instructions for causing a computer to execute a communication method, the communication method comprising:

performing scan for a Neighbor Awareness Networking (NAN) cluster, by receiving a discovery beacon, other than a first NAN cluster where the communication apparatus participates;

determining, in a case where a second NAN cluster, which has a cluster grade that is higher than a cluster grade of the first NAN cluster, is detected by the scan, whether the communication apparatuses is performing wireless data communication, which is different from the scan, with a communication partner in the first NAN clusters;

continuing participating in the first NAN cluster in a case where it is determined that the communication apparatus is performing the wireless data communication; and stopping participating in the first NAN cluster and join the second NAN cluster according to detection of the second NAN cluster in a case where it is determined that the communication apparatus is not performing the wireless data communication.

* * * * *